(12) United States Patent
Showers

(10) Patent No.: US 9,096,031 B2
(45) Date of Patent: *Aug. 4, 2015

(54) THERMALLY BROKEN HOLLOW POLYCARBONATE SHEET WINDOW GLAZING

(76) Inventor: Robert James Showers, Naugatuck, CT (US)

( * ) Notice: Subject to any disclaimer, the term of this patent is extended or adjusted under 35 U.S.C. 154(b) by 680 days.

This patent is subject to a terminal disclaimer.

(21) Appl. No.: 13/098,120

(22) Filed: Apr. 29, 2011

(65) Prior Publication Data

US 2012/0225239 A1    Sep. 6, 2012

Related U.S. Application Data

(63) Continuation of application No. PCT/US2011/025957, filed on Feb. 23, 2011, and a continuation-in-part of application No. 13/081,928, filed on Apr. 7, 2011.

(60) Provisional application No. 61/447,747, filed on Mar. 1, 2011.

(51) Int. Cl.
*B32B 3/24* (2006.01)
*B32B 1/06* (2006.01)
*B32B 3/26* (2006.01)

(52) U.S. Cl.
CPC . *B32B 1/06* (2013.01); *B32B 3/266* (2013.01); *Y02B 80/26* (2013.01); *Y10T 428/234* (2015.01); *Y10T 428/239* (2015.01); *Y10T 428/24331* (2015.01)

(58) Field of Classification Search
CPC ....................................................... B32B 1/06
USPC ........ 428/138, 34; 52/204.593, 786.1, 786.13
See application file for complete search history.

(56) References Cited

U.S. PATENT DOCUMENTS

| | | | |
|---|---|---|---|
| 5,784,853 A * | 7/1998 | Hood et al. | 52/786.13 |
| 7,641,954 B2 | 1/2010 | Rouanet et al. | |
| 7,732,496 B1 | 6/2010 | Leventis et al. | |
| 2005/0048231 A1 | 3/2005 | Morphet | |
| 2012/0081794 A1* | 4/2012 | Showers | 359/613 |

FOREIGN PATENT DOCUMENTS

EP          819817       3/2004

\* cited by examiner

*Primary Examiner* — William P Watkins, III

(57) ABSTRACT

A thermally broken hollow polycarbonate sheet or vessel for day-lighting or sky-lighting applications. The hollow polycarbonate sheet comprises of an internal cavity walls that are thermally broken by thermal breaks and, or, a continuous thermal break component. The hollow polycarbonate sheet is a two sheet component. The two sheets are connected by means of the thermal break or breaks. In another embodiment of the invention, the hollow sheet is a one part sheet. Panels can be connected in series.

27 Claims, 13 Drawing Sheets

THERMALLY BROKEN HOLLOW POLYCARBONATE SHEET WINDOW GLAZING

The current application is a continuation in part of PCT Application Number PCT/US11/25957 filed on Feb. 23, 2011, claims benefit of U.S. Provisional Patent Application No. 61/447,747 filed Mar. 1, 2011, and is a continuation in part of U.S. Utility patent application Ser. No. 13/081,928 filed Apr. 7, 2011.

FIELD OF THE INVENTION

The invention relates generally to hollow polycarbonate sheet window glazing or panels. It is the objective of the present invention to reduce thermal conduction passing through a hollow polycarbonate sheet window glazing or thermoplastic panels.

BRIEF DESCRIPTION OF THE PRIOR ART

The U.S. Pat. No. 7,732,496 introduces polymer cross-linked aerogels (X-Aerogels) for commercial insulation applications that are from 2 to 10 times higher than polymer foams. This technology includes aerogels that are extremely lightweight glass foams having pores ranging from 10 to 50 nanometers. When serving as insulation it does not require a high vacuum to maintain low thermal conductivity. Aerogels are traditionally very fragile and lack durability and elasticity when exposed to the environment. This technology significantly improves upon the durability and mechanical properties while maintaining desirable properties that aerogel is known for. This technology involves cross-linking and conformable coating on the individual skeletal aerogel nanoparticles with polymers resulting in increasing its strength more than 100 times. Traditional silica is fragile and easily broken whereby a cross-linked aerogel is capable of supporting a load. Certain formulations include light filtration and optical transparency as a thermal breaking insulator. Transparent and translucent formulations allow light to pass through them while serving as a highly effective insulator. Another benefit of this technology is that it maintains its shape even after compression. This technology has never been manufactured as a thermal break or fitted for the configuration of structural polycarbonate sheeting cavities. This technology has never been formed to interlock with any type of transparent or translucent glazing.

The U.S. Pat. No. 7,641,954 introduces a panel and glazing system that makes use of thermoplastic panels with continuous internal channels lacking a thermal breaking design that is able to hold aerogel compound. The insulated glazing system proposed in this patent makes use of two U shaped elements to create spacing to bind the continuous non-thermally broken thermoplastic panels for insulation. The insulated glazing system instead of using two flat glass panes with spacers and sealants makes use of U-shaped glass elements to seal the insulating panel.

The U.S. Pat. No. 4,950,344 introduces a method of manufacturing a multiple-glass-pane glazing unit having a spacer serving as a thermal break. The spacer is located peripherally on the glass panes only. The spacer is not bound by the glazing's actual design by itself. The spacer is bonded only by adhesives or bonding materials. This method bonds poorly when the material is not a glazing made of glass but is polycarbonate glazing. The presented prior art is only bonded at the periphery of the panes made of glass. Later in the manufacturing process due to wind load, thermal cycling and contraction and expansion, a necessary supporting window frame, typically made of wood, vinyl, metal or fiberglass, is utilized to further ensure necessary structural integrity and adhesion of the thermal breaking spacer. Polycarbonate is far more flexible than glass when faced with wind load, thermal cycling, expansion and contraction. As a result, it is harder to maintain a bond to polycarbonate over an extended period of time. The presented prior art therefore does not include an interlocking spacer serving as a thermal breaking spacer that is bound in anyway by the glazing's actual design.

The United States Patent Application Publication 2007/0122588 A1 introduces a glazing unit with a honeycombed structure to contain silica aerogel particles. A commercial product which involves the enclosure of aerogel in vessels is used as day-lighting windows. None of the prior thermoplastic panel art as stated above is thermally broken polycarbonate due to its continuous design. The polymer cross-linked aerogels (X-Aerogels) explained as prior art has never been manufactured in shape or design to be interlock with thermally broken, hollow polycarbonate sheet window glazing.

The technical features of the present invention will be appreciated by those of skill in the art. Structured hollow polycarbonate glazing sheets come in many sizes, shapes and configurations that are traditionally continuous polycarbonate and not thermally broken. The present invention reduces thermal conduction passing through these hollow polycarbonate sheet window thermoplastic panels. The present invention uses technology featured in U.S. Pat. No. 7,732,496, a polymer cross-linked aerogels (X-Aerogels), as a transparent or translucent thermal break. (Structural silicone foam may also be used). Polymer cross-linked aerogels (X-Aerogels) are better insulator than polymer foams, and are preferable for the invention as transparent or translucent thermal breaks and, or, interior polycarbonate panel cavity fillers. Aerogels are traditionally extremely fragile and lack durability and elasticity when exposed to the environment. This technology as a thermal break or cavity filler provides necessary durability and mechanical properties while maintaining desirable properties that aerogel is known for. Traditional silica is fragile and easily broken whereby a cross-linked aerogel is capable of serving as thermal breaks and cavity fillers and supporting the load in a thermally broken polycarbonate panels while providing light filtration and optical transparency or translucency. Transparent and translucent formulations allow light to pass through while serving as a highly effective insulator. The thermal break is manufactured to interlock with the inventions transparent or translucent glazing design. Structural foam laminated with a highly reflective mirror like film can also serve as a thermal break for the invention. The invention is not continuous internal polycarbonate channels lacking a thermal breaking design. When faced with wind load, thermal cycling, expansion and contraction the interlocking design with an added acrylic transparent adhesive stays secured over an extended period of time. The polymer cross-linked aerogel (X-Aerogels) thermal breaks are manufactured to a conformal fitting shape so designed to interlock with, or for thermally breaking, hollow polycarbonate sheet window glazing along with having thermal breaking holes in the polycarbonate in order to create a superior insulating effect over traditional continuous non-thermally broken polycarbonate hollow sheet designs. The same polymer cross-linked aerogels (X-Aerogels) can also be used to fill cavities. Cabot translucent nanogel particles used for day-lighting is another option that may be used to fill all remaining cavities.

BACKGROUND OF THE INVENTION

Polycarbonate hollow sheets, twin wall, triple wall and multiwall in many sizes and configurations, are being used for windows and skylights and have a minimal ability to insulate due to their continuous nature. Products such as twin wall, triple wall, multiwall and panels having a honeycomb design are commonplace industry terms. One popular trade name for the resin used to manufacture these hollow sheets or panels is Lexan. Some have filled these with aerogel particles to increase their insulating properties. The air or aerogel inside these panels in the panel cavities add a moderate amount on insulating properties. Heat is transferred through the solid non-thermally broken polycarbonate walls that create the hollow cavities. Many have tested the use of these hollow polycarbonate sheets while filled with aerogel or air for daylighting windows and skylights and due to the thermal transfer and its negative effect the market share growth have been mediocre. This problem up until this invention has not been effectively addressed. By having thermally broken hollow polycarbonate sheets that are not continuous, as traditionally polycarbonate hollow sheets are, that are filled with air or aerogel having a significant improvement in regard to insulating performance the advancement of this industry and related day-lighting, window and skylight products would advance.

DETAIL DESCRIPTIONS OF THE INVENTION

Figure 1:
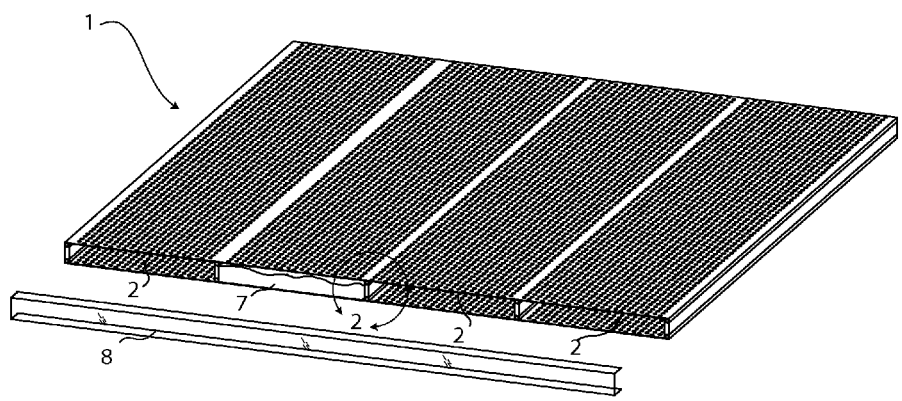
FIG. 1 is a perspective view of an embodiment of the present invention showing one of the cavities being filled with the insulating elements and the end sealing film separated from the hollow sheet in which a detailed view is taken and shown in FIG. 2.

All illustrations of the drawings are for the purpose of describing selected versions of the present invention and are not intended to limit the scope of the present invention. Although suitable materials are specified for the invention, all other suitable materials, to include emerging technologies that may be made commercially available in the future, may also be used. Polycarbonate hollow sheets in many sizes and configurations are being used for windows and skylights and have a minimal ability to insulate. Products such as twin wall, triple wall and multiwall are common industry names and are not thermally broken. The preferred polycarbonate for the present invention is commercially available from Sabic innovative plastics known as Lexan thermoclear extruded polycarbonate thermoplastic. The Lexan thermoclear polycarbonate is well established for having a high level of optical and mechanical properties and is well suited for extruded hollow sheets such as twin wall, triple wall, multiwall and others. Various Lexan products are known as Lexan Thermoclear Dripguard (LTD), Lexan Thermoclear Easyclean (LTE, Lexan Thermoclear Sun XP (LT2XP), Lexan Thermoclear Plus (LT2UV), and Lexan Thermoclear sheet (LTC). Bayer Material Science is another major international manufacturer of polycarbonate hollow polycarbonate sheets and also includes many sizes and configurations. Certain Bayer products are known as Makrolon multi-sheets ranging from multi wall sheets that are known as double, triple, quadruple or sextuple. One side of Makrolon multi-sheets is offered with a coextruded layer of special UV and weather protection. The reverse side of the same sheet has a "no drop" layer technology to prevent unwanted condensation. Some of these existing products are known as Makrolon multi-UV-HR, Makrolon multi UV IQ-Relax, Makrolon multi UV no drop and Makrolon multi UV FR. Although hollow polycarbonate sheets are traditionally extruded the invention may also be mold injected when economically desirable or based on the design when it becomes cost or design practical. Some have filled these with aerogel particles to increase their insulating properties. The air or aerogel inside these panels in the panel cavities add a moderate amount on insulating properties. Heat is transferred through the solid non-thermally broken polycarbonate walls that create the hollow interior cavities. Many have tested the use of these hollow polycarbonate sheets while filled with aerogel for day-lighting windows and skylights and due to the thermal transfer and its negative effect the market share growth have been mediocre. This problem up until this invention has not been effectively addressed. By having a thermally broken hollow polycarbonate sheet that is not continuous polycarbonate filled with suitable gel insulating substance having a significant improvement in regard to insulating performance the advancement of this industry and related day-lighting, window and skylight products would advance. Manufacturers such as Cabot of Massachusetts, USA offer their aerogel product dubbed Nanogel to many day-lighting, window and skylight fabricators and the products having hollow continuous polycarbonate are not thermally broken.

Figure 2:
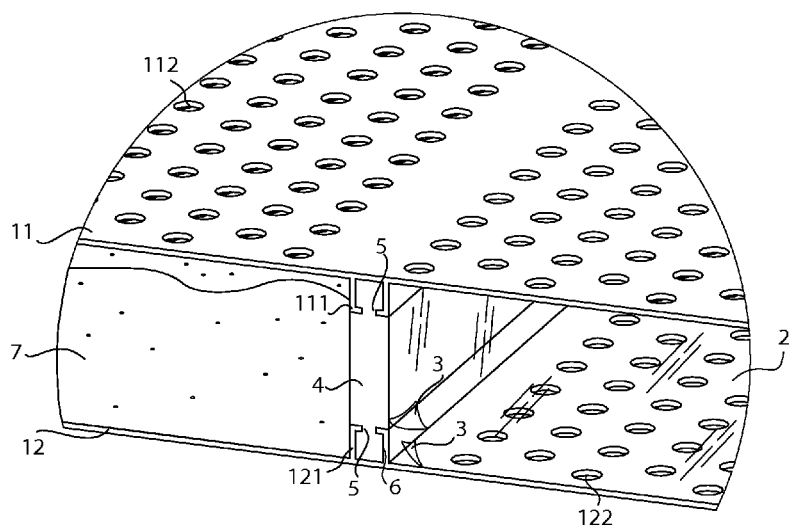
FIG. 2 is a detailed view of an embodiment of the present invention where the first sheet and the second sheet do not have the plurality of first holes and the plurality of second holes. The internal cavity walls are laminated by the interior vessel film to seal the plurality of first holes and the plurality of second holes.

In reference to FIG. 1-2, the invention is hollow sheets 1 that are in two separate parts rather than traditional fully integrated hollow polycarbonate sheets. The two separate parts of the present invention include a first sheet 11 and a second sheet 12. The way these are joined is by thermal breaks or a continuous thermal break that attaches the first sheet 11 of the invention to the second sheet 12 so that the invention appears similar to traditional hollow products. When continuous thermal breaks are used, it is preferred they be transparent or translucent polymer cross-linked aerogels (X-Aerogels) in order to allow light to pass through. Both the first sheet 11 and the second sheet 12 are manufactured to comprise of a plurality of first thermal break notches 111 and a plurality of second thermal break notches 121. The plurality of first thermal breaks notches 111 and the plurality of second thermal break notches 121 are latches that extend from the first sheet 11 and the second sheet 12, respectively. The two separate polycarbonate sheets are connected by corresponding thermal break notches by the thermal break 4. The thermal break 4 comprises of notch grooves 5 positioned on the top and bottom ends. The notch grooves are grooves traversing along each of the thermal breaks. The notch grooves 5 of each thermal break 4 are shaped correspondingly to the plurality of first thermal break notches 111 and the plurality of second thermal break notches 121. The first sheet 11 is connected to the thermal break 4 by means of the notch groove 5 being engaged to the plurality of first thermal break notches 111. The second sheet 12 is connected to the thermal break 4 by means of the notch groove 5 being engaged to the plurality of second thermal break notches 121. The thermal break 4 is slid into place between the plurality of first thermal break notches 111 and the plurality of second thermal break notches 121. A transparent thermal break adhesive 6 is used to firmly the secure the thermal breaks 4 to the polycarbonate connections of the first sheet 11 and the second sheet 12.

The first sheet 11 and the second sheet 12 comprise a plurality of first holes 112 and a plurality of second holes 121, respectively. The plurality of first holes 112 and the plurality of second holes 121 are small holes that traverse through the first sheet 11 and the second sheet 12. The plurality of first holes 112 and the plurality of second holes 112 are evenly distributed through each surface of the first sheet 11 and the second sheet 12. The plurality of first holes 112 and the plurality of second holes 121 serve to thermally break the present invention for the reduction of the amount of material used on the first sheet 11 and the second sheet 12. As a result of lesser material used to manufacture the first sheet 11 and the second sheet 12, there is also a reduction of the amount of direct conduction that may occur through the present invention.

The plurality of cavities 2 is laminated with an interior vessel film 3 to seal the plurality of first holes 112 and the plurality of second holes 121. The sealing of the plurality of first holes 112 and the plurality of second holes 121 also prevents the insulating substance filled into the plurality of cavities 2 from falling or leaking out of the present invention. In the preferred embodiment of the present invention, the interior vessel film 3 is a highly reflective film using a suitable transparent adhesive. A transparent film is preferred when thermal breaks, or a continuous thermal break, are utilized as they are transparent or translucent polymer cross-linked aerogels (X-Aerogels) in order to allow light to pass through them. The interior vessel film 3 can be films such as BoPET (Biaxially-oriented polyethylene terephthalate) that is known to be strong and a chemically resistant film that is highly reflective. Other suitable window films may also be used to laminate the thermal break 4 for aesthetic purposes. One manufacture of BoPET is trade named Mylar. The film serves the purpose of reflecting a image back for the purpose of making the thermal break 4 less noticeable and inconsistent with the polycarbonate and/or suitable gel insulating substance, should a suitable material used to manufacture the thermal break 4 not be translucent, transparent or the same color as the polycarbonate and/or suitable gel insulating substance. The thermal break 4 is laminated with the highly reflective Mylar for the purpose of reflecting radiant heat in addition to aesthetic purposes. Thermal radiation is visible light emitted from matter due to thermal energy which is measured by temperature.

The connection of the first sheet 11 and the second sheet 12 by the thermal breaks 4 define a plurality of cavities 2. The plurality of cavities 2 is the spaces defined by the first sheet 11, the second sheet 12, and the thermal breaks 4. The plurality of cavities 2 provides the present invention with a space where an insulating element 7 can be filled. The insulating element 7 is able to provide the present invention with additional insulating properties. The insulating element 7 can be Nanogel particles, Aerogel particles, Maerogel particles or other suitable gel technologies that may, in the future be approved upon. Transparent or translucent polymer cross-linked aerogels (X-Aerogels) are also suitable so may also be used to fit and further insulate interior cavities and in order to allow light to pass through. All these types of gels are excellent insulators trapping air. These gels are generally a large percentage of air and a very small percentage of actual solid. The large amount of air that this material traps is what makes it a strong insulator. However, these gels are not transparent, but rather translucent other than relatively few certain emerging technologies such as transparent polymer cross-linked aerogels (X-Aerogels). Transparent polymer cross-linked aerogels (X-Aerogels) do feature transparency over traditional translucent aerogel. Therefore, although not allowing users to see through the insulating panel when using traditional Aerogel or products such as Cabot translucent Nanogel particles it will still allow light to traverse through it. The preferred material for the insulating element 7 is the translucent Cabot Nanogel translucent day-lighting particles due to its abilities to allow the desired amount of light through. Transparent polymer cross-linked aerogels (X-Aerogels) is highly desirable as cavity inserts (not as particles) when a non-particle insulating substance is desired or transparency over Nanogel is desired. The second preferred translucent material for the insulating element 7 is traditional Aerogel and the third is Maerogel. The plurality of cavities 2 further comprises of a plurality of end openings. The plurality of end openings are openings positioned on the ends of the present invention leading into the plurality of cavities 2. To seal the plurality of end openings, the present invention further comprises of an end sealing film 8. The end sealing film 8 is adhered onto and over the plurality of end openings to completely seal the insulating element 7 within the plurality of cavities 2.

The thermal break 4 is an element of low thermal conductivity placed between the two polycarbonate sheets to reduce the direct flow of thermal energy. In the preferred embodiment of the present invention, the thermal break 4 is made from suitable structural foam. For a transparent thermal break option transparent polymer cross-linked aerogels (X-Aerogels) is preferred and does not require a film laminate that has a mirror like surface finish as light can be permitted to pass through it and it blends in well to polycarbonate and, or aerogel. Structural foam for a glazing spacer serving as a thermal break is commercially available from Edgetech and Dow Corning. The structural silicone foam manufactured by Edgetech is also known as the same silicone structural foam that is currently used to manufacture what is known as Edgetech's Spacer. Dow adhesive designed specifically for the structural foam shall be applied to the silicone structural foam in order to effectively bond the film having the highly reflective mirror like surface. The mirror like surface shall serve to reflect the image of the polycarbonate and, or suitable gel insulating substance for esthetic purposes and, or, reflect radiant heat. Regarding a mirror like film laminate for the thermal break, transparent or translucent thermal breaks such as polymer cross-linked aerogels (X-Aerogels) are highly desirable for the invention whereby a mirror like film would no longer be necessary for esthetic purposes. Translucent or transparent films would therefore be suitable as a laminate for allowing a desired amount of light to pass through the transparent or translucent polymer cross-linked aerogels (X-Aerogels) material used for the thermal breaks. The National Aeronautics and Space Administration, NASA Glenn Research Center (GRC) have resolved plain silica aerogels being extremely fragile by means of their cross-linked aerogel in order to adequately support a load through polymer cross-linked aerogels (X-Aerogels) technology. NASA (GRC) researchers have significantly improved the durability and mechanical properties of aerogels without significantly affecting in a negative way their highly beneficial properties by means of a coating technology as well as cross-linking the individual skeletal aerogel nanoparticles by means of engineering polymers. This technology adds 100 times the strength over traditional aerogel while having improved elasticity rendering them suitable as a material for the inventions thermal breaks should structural silicone foam that's used in the fenestration industry not be utilized as a material for the thermal breaks. These NASA material formulations offer light penetration and filtration features to the thermal breaks while maintaining a highly insulating effect without requiring a high vacuum. The NASA Glenn Research Center technology reference is U.S. Pat. No. 7,732,496. Cross-linking is accomplished by a reaction propagated by means of the cross-linker and a reaction between the cross-linker and the surface of the structural framework that exists in the aerogel. This technology is being made commercially available through NASA's Innovative Partnerships Program that includes polymer cross-linked aerogels (LEW-17685-1) or aerogel/composite structures using X-Aerogel internal structures (LEW-18017-1). Transparent polymer cross-linked aerogels (X-Aerogels) are highly desirable for manufacturing the thermal breaks where light is desired to pass through the thermal break. The structural foam thermal break serving as a spacer is preferably a thermo-set silicone foam. The thermo-set polymer thermal break serving as the spacer is set to size and shape during heat curing while factoring in the film thickness as a final laminate in order to precision fit the contour of the receiving contour in the polycarbonate receiver. The thermal break spacer retains its flexibility and possesses a low compression set. The structural foam is bonded in place with a suitable high-performance acrylic adhesive. Silicone thermal breaking spacers used in the fenestration industry are known to resist heat flow up over 900 times more than aluminum. Suitable structural foams that are currently used in the insulating glazing unit (IGU) industry for manufacturing IGU spacers has proved to be a low conductive thermal material as used against two adjoining flat layers of glass serving as an IGU outside parameter spacer. The utilization in this different and innovative way, as described in the invention, advances the performance of hollow vessels, panels, and sheets used for day-lighting, windows and skylights in order to break thermal conduction that would otherwise travel between the solid polycarbonate closest to the conditioned living space and the opposite side closest to the outside elements. Being a poor conductor of heat, the suitable structural foam is an effective material as the thermal break 4 in the present invention. The thermal break 4 is also a load bearing thermal insulating component used to reinforce the polycarbonate assembly. As a separator material, the thermal break 4 serves to reduce temperature transfer. The first sheet 11 and the second sheet 12 are separated by the thermal breaks 4 at each of the thermal break 4 notches. The thermal breaks 4 are laminated with a highly reflective laminate using a transparent adhesive to secure the reflective Mylar to the thermal breaking components that joins the polycarbonate. This Mylar reflects the appearance of the polycarbonate in order to make the thermal breaks 4 appear less noticeable. Transparent or translucent polymer cross-linked aerogels (X-Aerogels) that are transparent when used for the thermal breaks do not require a mirror like surface film laminate. If the panels are aerogel filled the thermal breaks 4 serve to join the two invention parts into one are aesthetically superior to ones that would more readily stand out in their appearance. Transparent or translucent polymer cross-linked aerogels (X-Aerogels) would not as readily stand out.

Although structural foam is preferred for the thermal break 4 other suitable flexible and strong aerogels (not brittle and friable) may be used. These include suitable emerging gel technologies that are enhanced having mechanically adequate properties by means of vapor-phase cross-linking, liquid-phase cross-linking, reduced bonding and fiber reinforcing. Especially included is polymer cross-linked aerogels (X-Aerogels) exhibiting rubber-like flexibility and made available as a translucent or transparent material. Polymers can be used to crosslink aerogels such as epoxides, polyisocyanates and polystyrene rendering them suitable and having low thermal conductivity. Other suitable materials may also be used to include emerging technologies that may be made available in the future.

Figure 16:
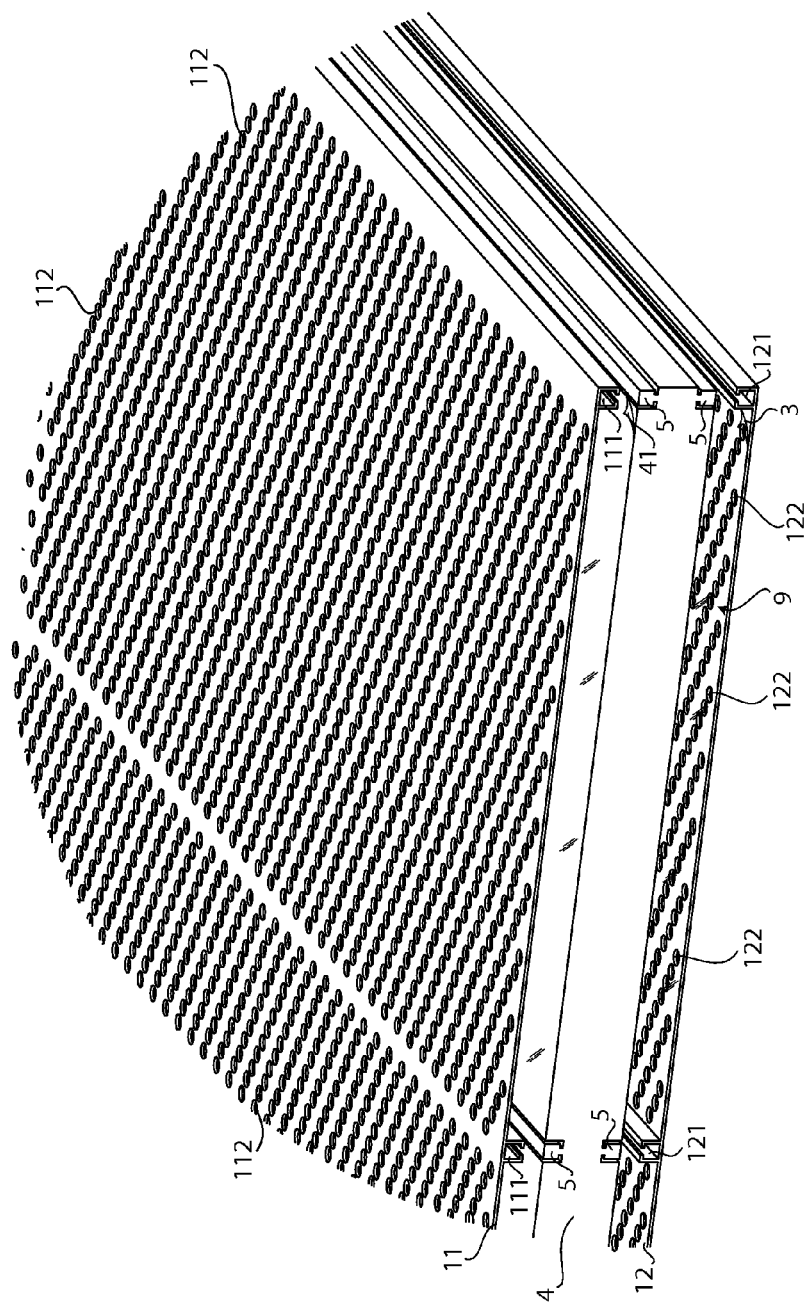
FIG. 16 is detailed perspective view of another embodiment of the present invention where the thermal break is continuous and completely fills the space between the first sheet and the second sheet. In this embodiment of the present invention, the thermal break is made from the material of solid transparent or translucent polymer cross-linked aerogels (X-Aerogels).
Figure 17:
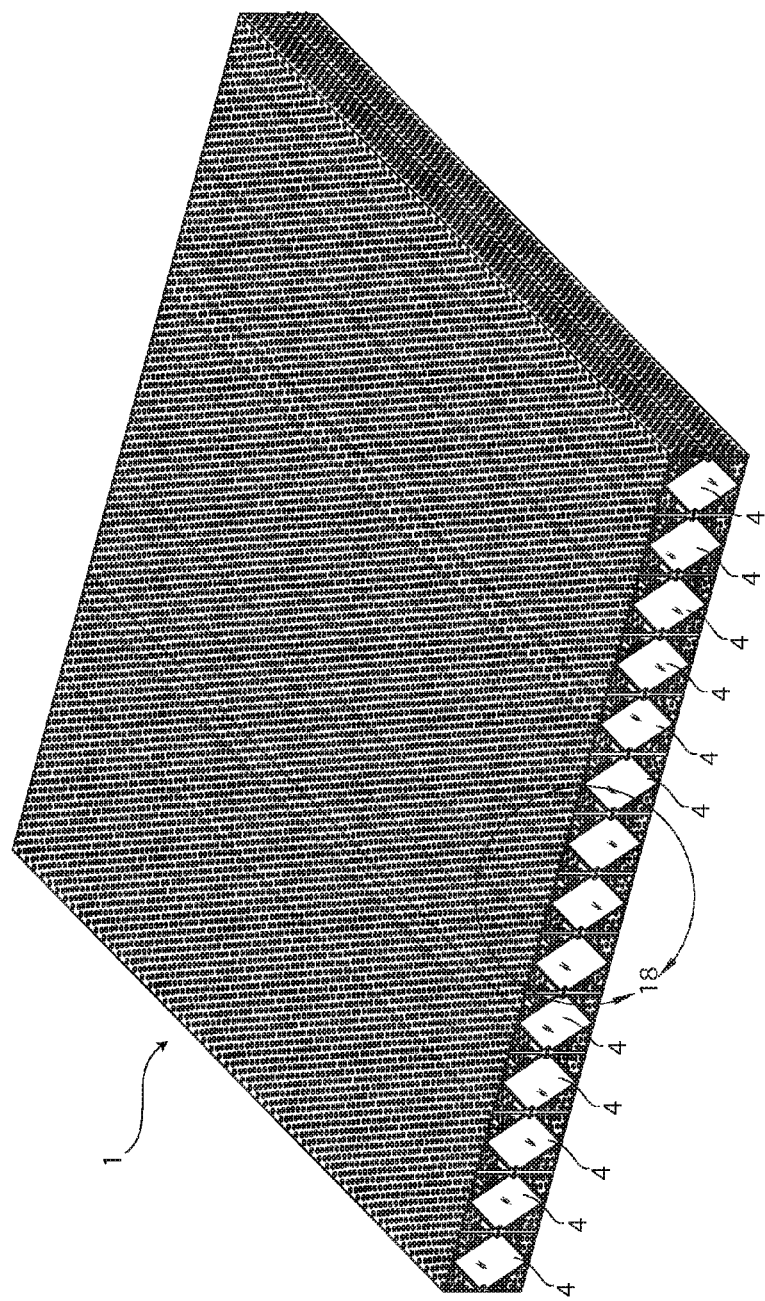
FIG. 17 is a perspective view of another embodiment of the present invention where the thermal break is continuous and completely fills the space between the first sheet and the second sheet. In this embodiment of the present invention, the thermal break is made from the material of solid transparent or translucent polymer cross-linked aerogels (X-Aerogels). The thermal break in this embodiment is shown in the shape of diamonds in series. A detailed view is taken and shown in FIG. 18.
Figure 18:
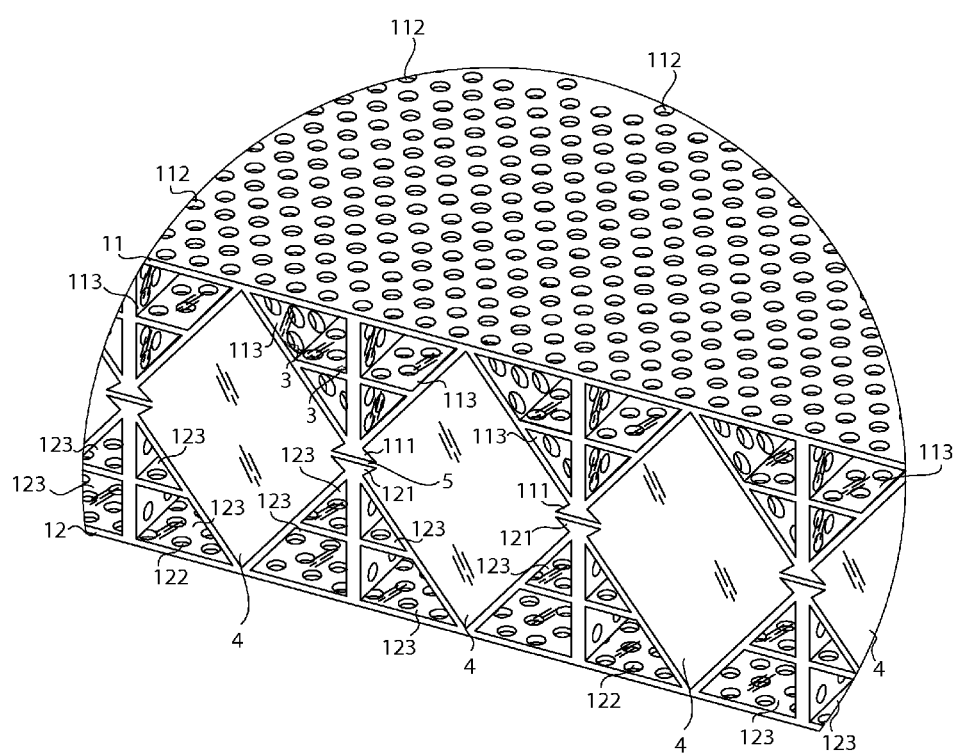
FIG. 18 is a detailed view of another embodiment of the present invention where the thermal break is continuous and completely fills the space between the first sheet and the second sheet. In this embodiment of the present invention, the thermal break is made from the material of solid transparent or translucent polymer cross-linked aerogels (X-Aerogels). The thermal break in this embodiment is shown in the shape of diamonds in series.

In reference to FIG. 16, in another embodiment of the present invention, instead of a plurality of thermal breaks, there is a continuous thermal break 4. Additionally, instead of a plurality of cavities, there is a sheet cavity. The sheet cavity is the space in between and defined by the first sheet 11 and the second sheet. The continuous thermal break 4 comprises of a plurality of notch grooves. The plurality of notch grooves is grooves that traverses along and is positioned on each side of the continuous thermal break 4 with protruding notches. The grooves and the protruding notch of the plurality of notch grooves are shaped correspondingly to the plurality of first thermal break notches 111 and the plurality of second thermal break notches 121. The first sheet 11 and the second sheet are connected by means of the continuous thermal break 4. The continuous thermal break 4 engages the plurality of first thermal break notches 111 and the plurality of second thermal break notches 121 by means of the plurality of notch grooves. To secure the plurality of notch grooves within the plurality of first thermal break notches 111 and the plurality of second thermal break notches 121 the thermal break adhesive is used. The continuous thermal break 4 is in complete contact with the first sheet 11 and the second sheet when engaged to the plurality of first thermal break notches 111 and the plurality of second thermal break notches 121. As a result, the continuous thermal break 4 completely fills the sheet cavity. With the continuous thermal break 4 filling the entire space in between the first sheet 11 and the second sheet, it is important that the continuous thermal break 4 to be made of a transparent or translucent material to allow light through the present invention. The interior vessel film 3 is adhered and laminated to the first sheet 11 and the second sheet. The interior vessel film 3 is positioned in between the first sheet 11 and the continuous thermal break 4 and between the second sheet and the continuous thermal break 4. The continuous thermal break 4 can possess the optical properties of being transparent, translucent, non-transparent, or non-translucent. In this embodiment of the present invention, a thermal break film 41 is laminated over the continuous thermal break 4. When the continuous thermal break 4 is transparent or translucent, the thermal break film 41 is also transparent to allow the optimal amount of light through the present invention. However, when the continuous thermal break 4 is non-transparent and non-translucent, the thermal break film 41 is reflective.

Figure 3:
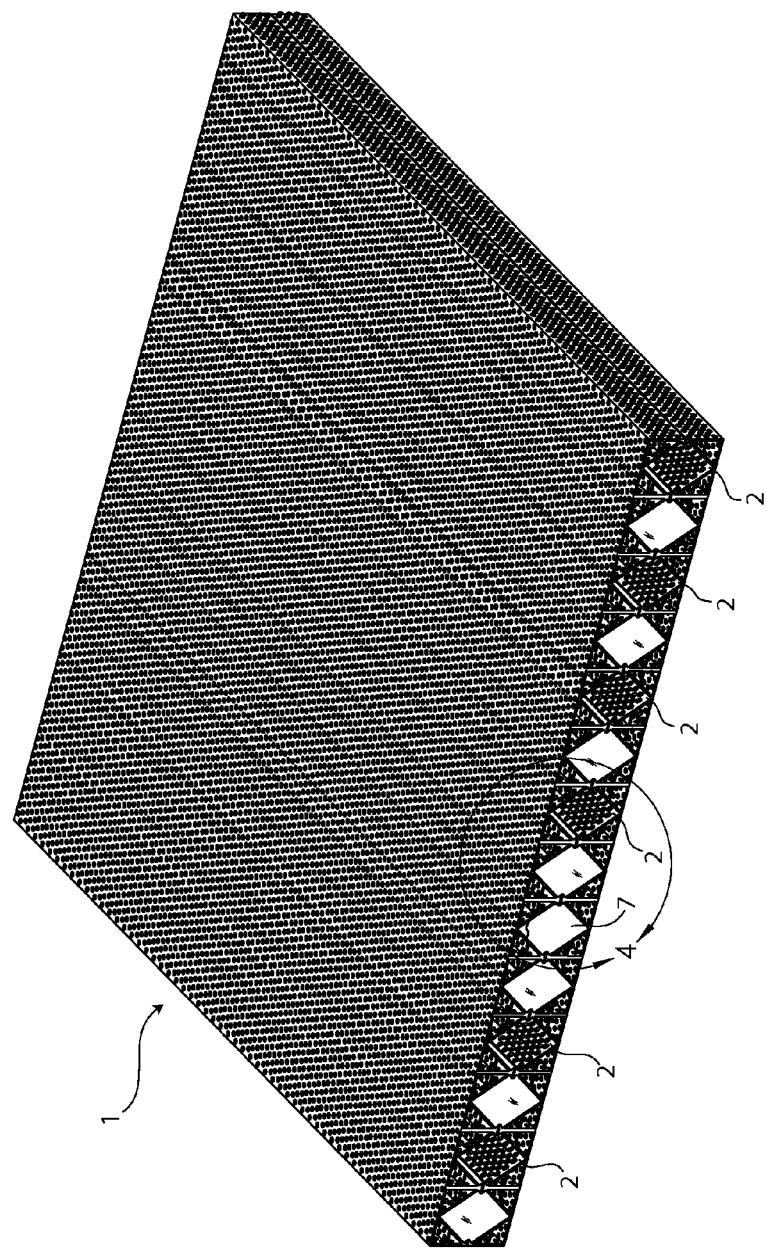
FIG. 3 is a perspective view of another embodiment of the present invention where the first sheet and the second sheet comprises the plurality of first cavities and a plurality of second cavities in which a detailed view is taken and shown in FIG. 4. In this embodiment, the plurality of cavities is shown taking a shape of a diamond. The thermal break is similarly shaped to connect the first sheet and the second sheet.
Figure 4:
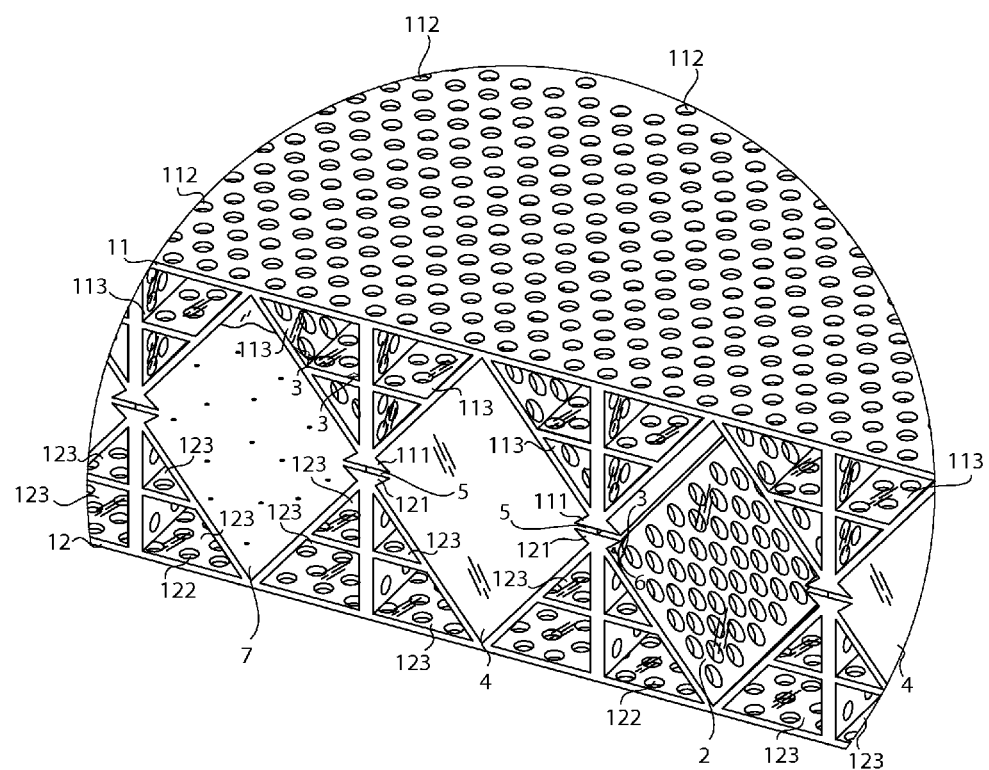
FIG. 4 is a detailed view of another embodiment of the present invention with diamond shaped cavities and diamond shaped thermal breaks.
Figure 5:
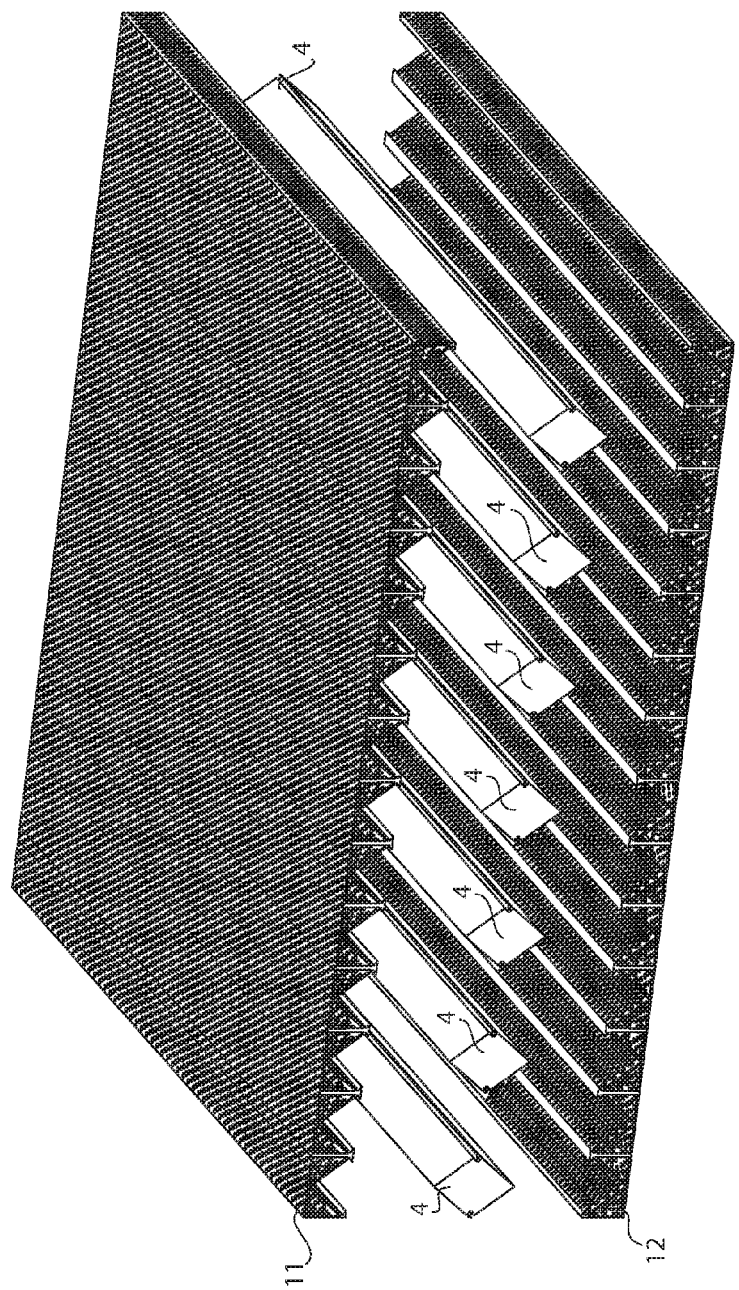
FIG. 5 is an exploded view of another embodiment of the present invention with diamond shaped cavities and diamond shaped thermal breaks.
Figure 6:
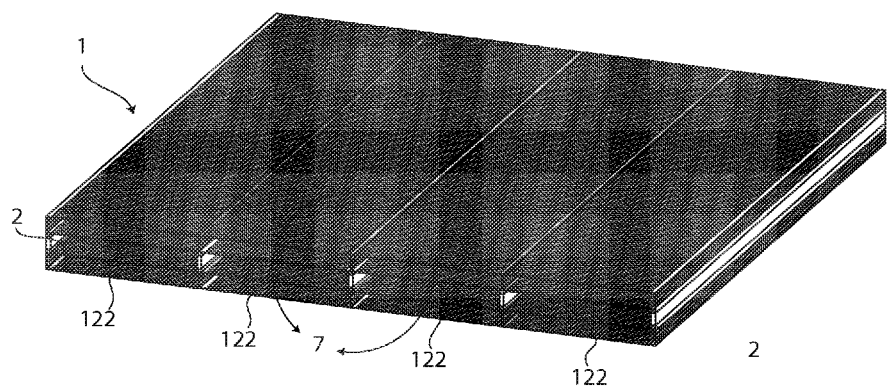
FIG. 6 is a perspective view of another embodiment of the present invention showing the first sheet and the second sheet with the plurality of first cavities and the plurality of second cavities positioned parallel to the plurality of cavities in which a detailed view is taken and shown in FIG. 7.
Figure 7:
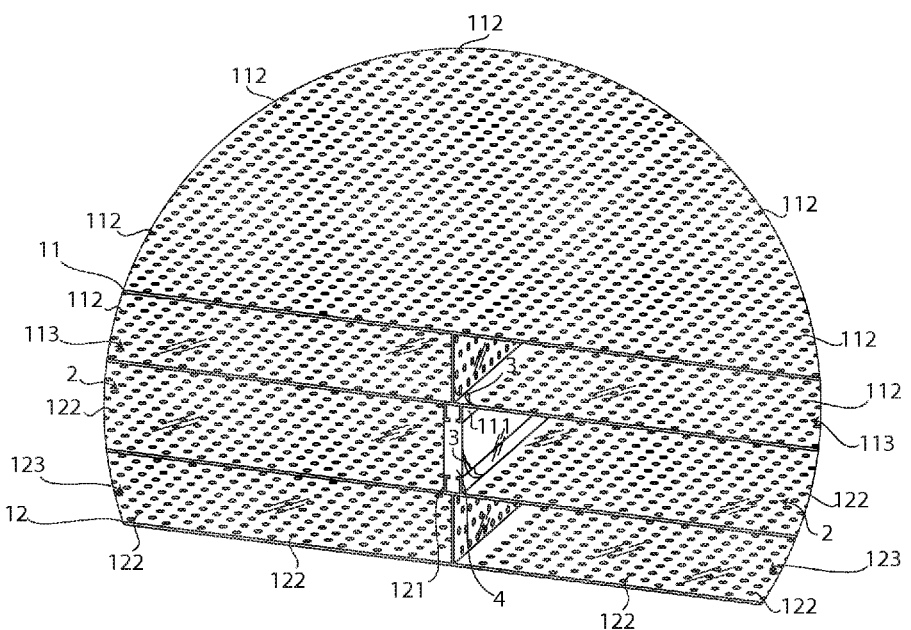
FIG. 7 is a detailed view of another embodiment of the present invention showing the first sheet and the second sheet with the plurality of first cavities and the plurality of second cavities positioned parallel to the plurality of cavities.

In reference to FIG. 2-7, in another embodiment of the present invention, the first sheet 11 and the second sheet 12 additionally comprise a plurality of first cavities 113 and a plurality of second cavities 123, respectively. The additional cavities on the first sheet 11 and the second sheet 12 provide each of the sheets with further insulating properties. The plurality of first cavities 113 and the plurality of second cavities 123 are isolated cavities that traverse through the length of the first sheet 11 and the second sheet 12 in parallel relationship to the plurality of first thermal break notches and the plurality of second thermal break notches 121. In this embodiment of the present invention, the plurality of first cavities 113 and the plurality of second cavities 123 provide the present invention with multiple walls. The plurality of first cavities 113 and the plurality of second cavities 123 can be manufactured in different shapes to achieve different aesthetic effects. The plurality of first cavities 113 and the plurality of second cavities 123 can be manufactured into triangular shapes to provide the plurality of cavities 2 a diamond shape, as shown in FIG. 3-4. As a result the thermal breaks 4 can also be manufactured into different shapes to connect the first sheet 11 to the second sheet 12. In this diamond shaped embodiment of the present invention, the thermal breaks 4 are similarly shaped with the plurality of cavities 2. As a result, the thermal break 4 is able to secure the first sheet 11 and the second sheet 12 at any one of the cavities. However, it is preferred that the thermal breaks 4 connected the first and second sheet 12 primarily at the ends of the first sheet 11 and the second sheet 12. Although the option of filling each of the plurality of cavities 2 is available, it is preferred that some of the plurality of cavities 2 be filled with the insulating element 7 or transparent or translucent polymer cross-linked aerogels (X-Aerogels). By filling some of the plurality of cavities 2 with the insulating element 7, the diamond shaped embodiment of the present invention is able to allow light through. Transparent or translucent polymer cross-linked aerogels (X-Aerogels) does allow light to pass through it.

Figures 8, 9:
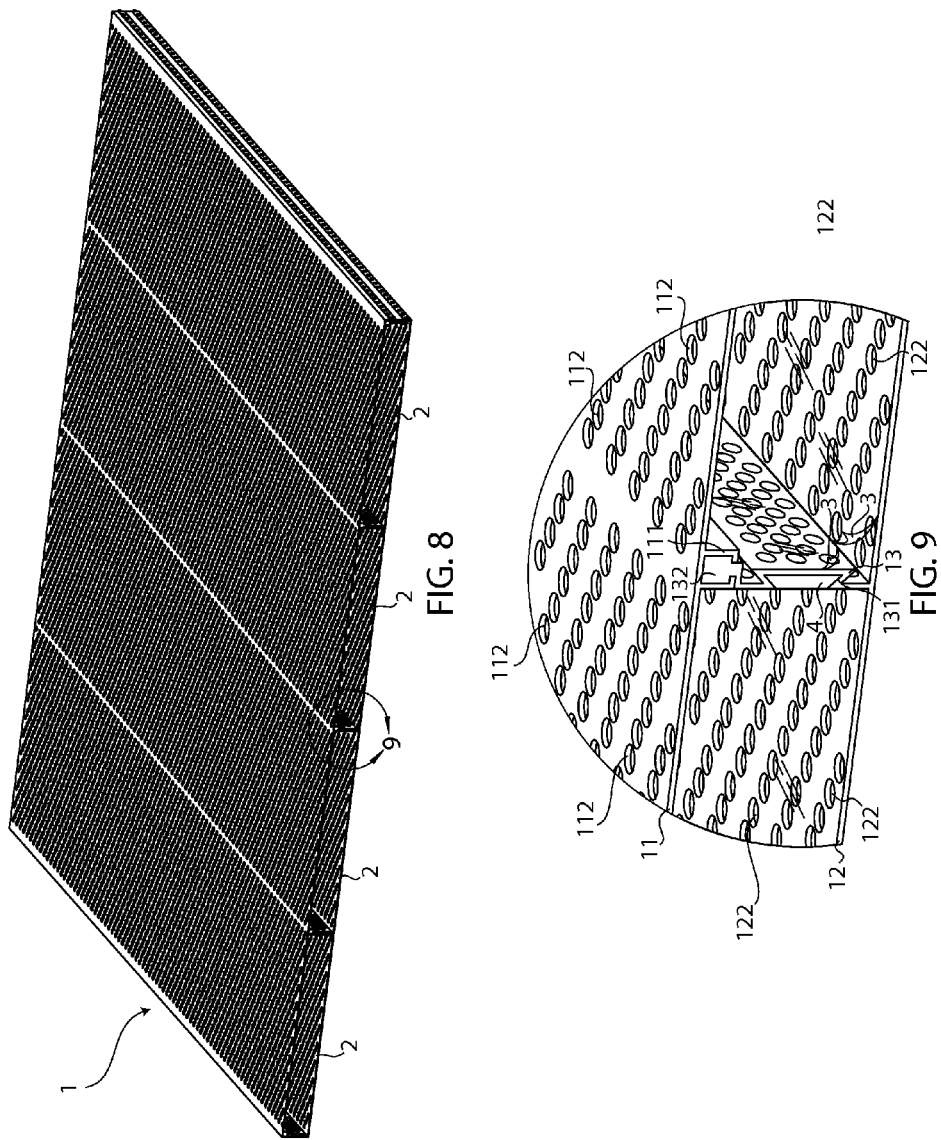
FIG. 8 is a perspective view of another embodiment of the present invention where the second sheet comprises the plurality of partitions to be connected with the first sheet in which a detailed view is taken and shown in FIG. 9.
FIG. 9 is a detailed view of another embodiment of the present invention where the second sheet comprises the plurality of partitions to be connected with the first sheet

In reference to FIG. 8-9, in another embodiment of the present invention, the thermal breaks 4 are not the components that connect the first sheet 11 and the second sheet 12 together. Instead, in this embodiment, the second sheet 12 comprises a plurality of partitions 13. The plurality of partitions 13 are partitioning walls that extend from the face of second sheet 12 corresponding the plurality of first thermal break notches 111. The plurality of partitions 13 comprises a thermal break groove 131 and a partition notch 132. In this embodiment of the present invention, the thermal breaks 4 are shaped to correspond to the thermal break groove 131 on each partition 13 and do not have notch grooves 5. The thermal breaks 4 are positioned and secured in each of the thermal break grooves 131 by means of the thermal break adhesive 6. The second sheet 12 is connected to the first sheet 11 by means of the partition notch 132 on each partition. The partitions notch 132 engages the plurality of first thermal break notches 111. The plurality of cavities 2 is then defined by the first sheet 11, the second sheet 12 and the plurality of partitions 13. The interior walls of the plurality of cavities 2 are still laminated with the interior vessel film 3 to seal the plurality of first holes and the plurality of second holes. With the plurality of first holes 112 and the plurality of second holes 122 sealed, the insulating element is filled into the plurality of cavities.

Figure 13:
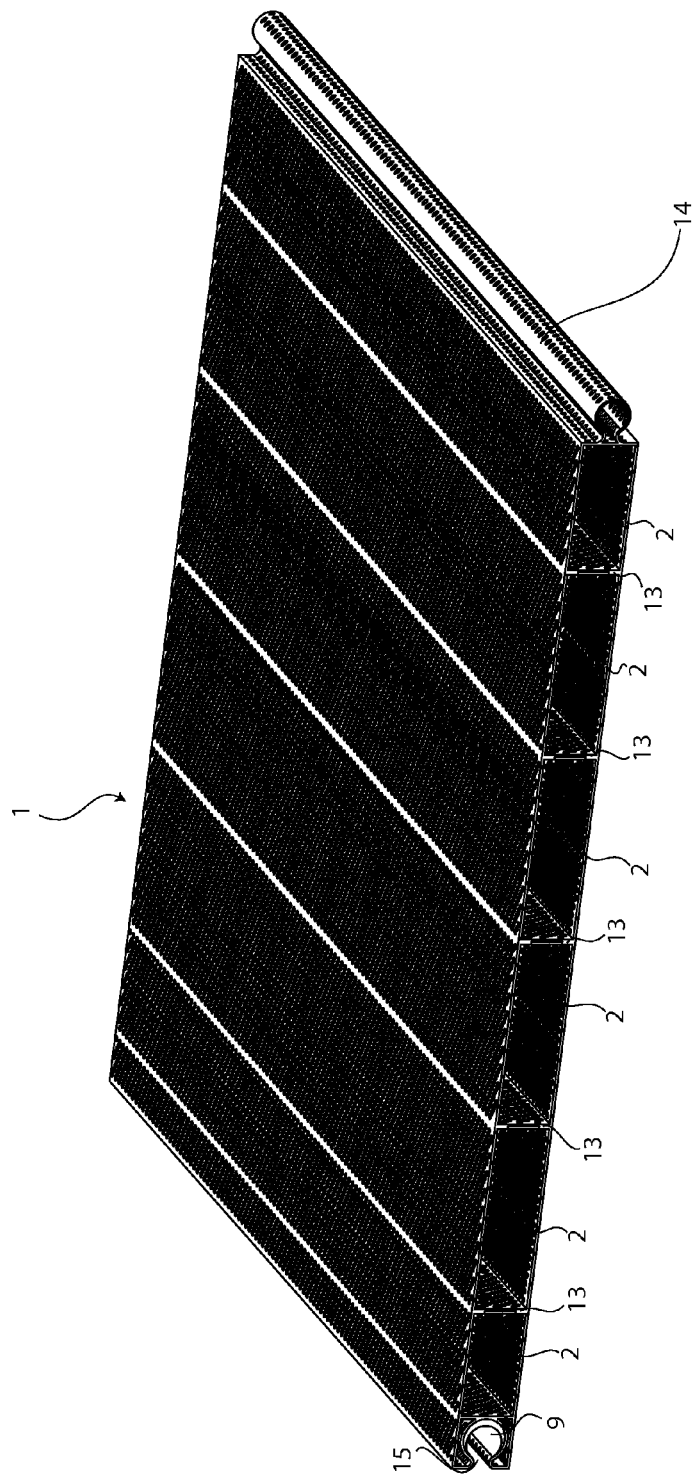
FIG. 13 is a perspective view of another embodiment of the present invention where the hollow sheet is one piece sheet that can be connected with other hollow sheets in series.
Figure 15:
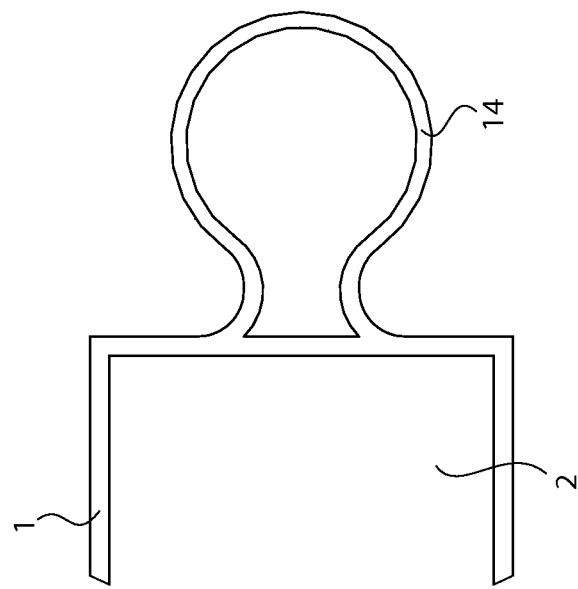
FIG. 15 is a front detailed view of the insert connector end of the embodiment of the present invention where the hollow sheet is a one piece sheet that can be connected with other hollow sheets in series.
Figure 14:
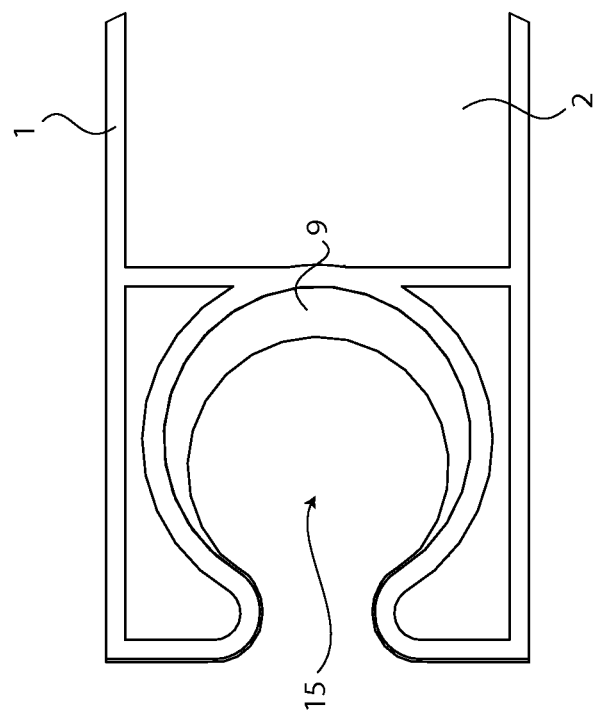
FIG. 14 is a front detailed view of the receiving connector end of the embodiment of the present invention where the hollow sheet is a one piece sheet that can be connected with other hollow sheets in series.

In reference to FIG. 13-15, in another embodiment of the present invention, the hollow sheet 1 is not separated in two parts. Rather, the hollow sheet 1 comprises a plurality of partitions 13, an insert connector end 14, a receiving connector end 15, and a plurality of holes 16. In this embodiment, the present invention additionally comprises of a connector thermal break 9. The hollow sheet 1 in this embodiment still comprises of the plurality of cavities 2. However, the plurality of cavities 2 is defined by the plurality of partitions 13 within the hollow sheet 1. Each of the plurality of partitions 13 comprises a thermal break groove 131 for the insertion of a thermal break. The thermal breaks 4 of this embodiment are elongated and shaped to correspond to the shape of the thermal break groove 131. The thermal breaks 4 are secured into the thermal break 4 grooves by means of the thermal break adhesive 6. The plurality of holes 16 is holes that traverse through all of the surfaces of the hollow sheet 1. The plurality of holes 16 serves to thermally break the present invention for the reduction of the amount of material used on the first sheet 11 and the second sheet 12. As a result of lesser material used to manufacture the hollow sheet 1, there is also a reduction of the amount of direct conduction that may occur through the present invention. Similar to the preferred embodiment of the present invention, the plurality of cavities 2 is still laminated by means of the interior vessel film 3. The film additionally serves to further provide insulating capabilities by reflecting radiant heat.

Figure 10:
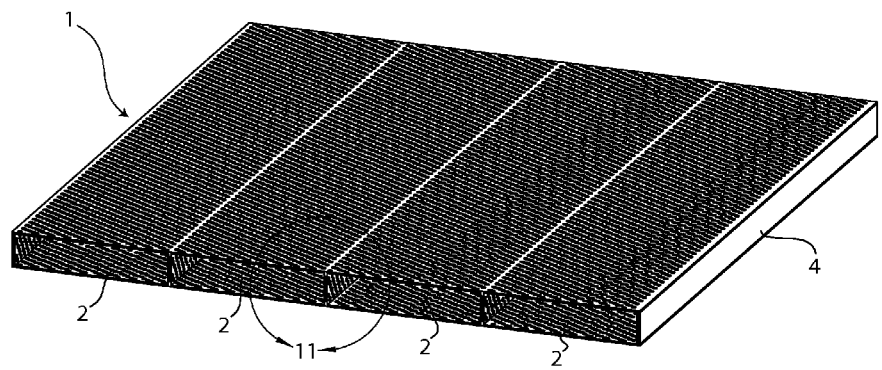
FIG. 10 is a perspective view of another embodiment of the present invention where the hollow sheet is one piece with the plurality of cavities being defined by the plurality of partitions in which a detailed view is taken and shown in FIG. 11.
Figure 11:
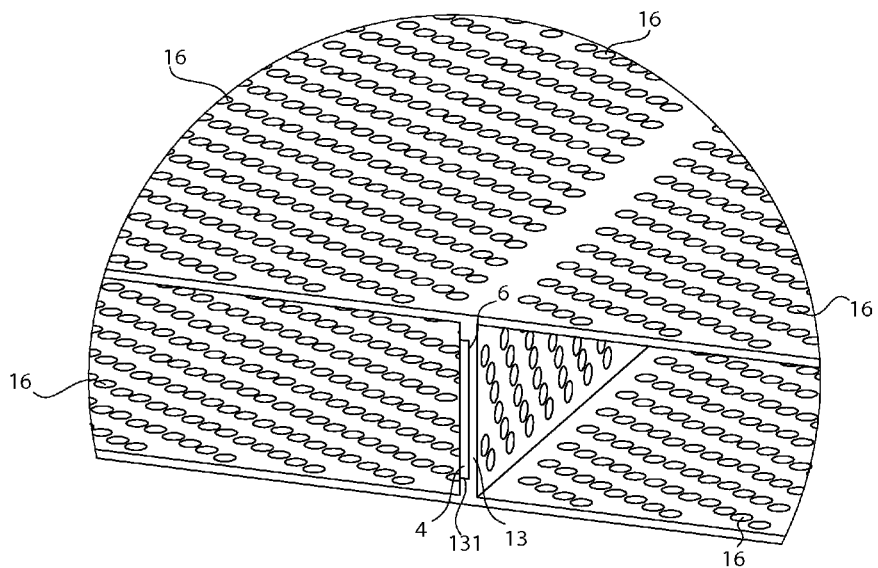
FIG. 11 is a detailed view of another embodiment of the present invention where the hollow sheet is one piece with the plurality of cavities being defined by the plurality of partitions.
Figure 12:
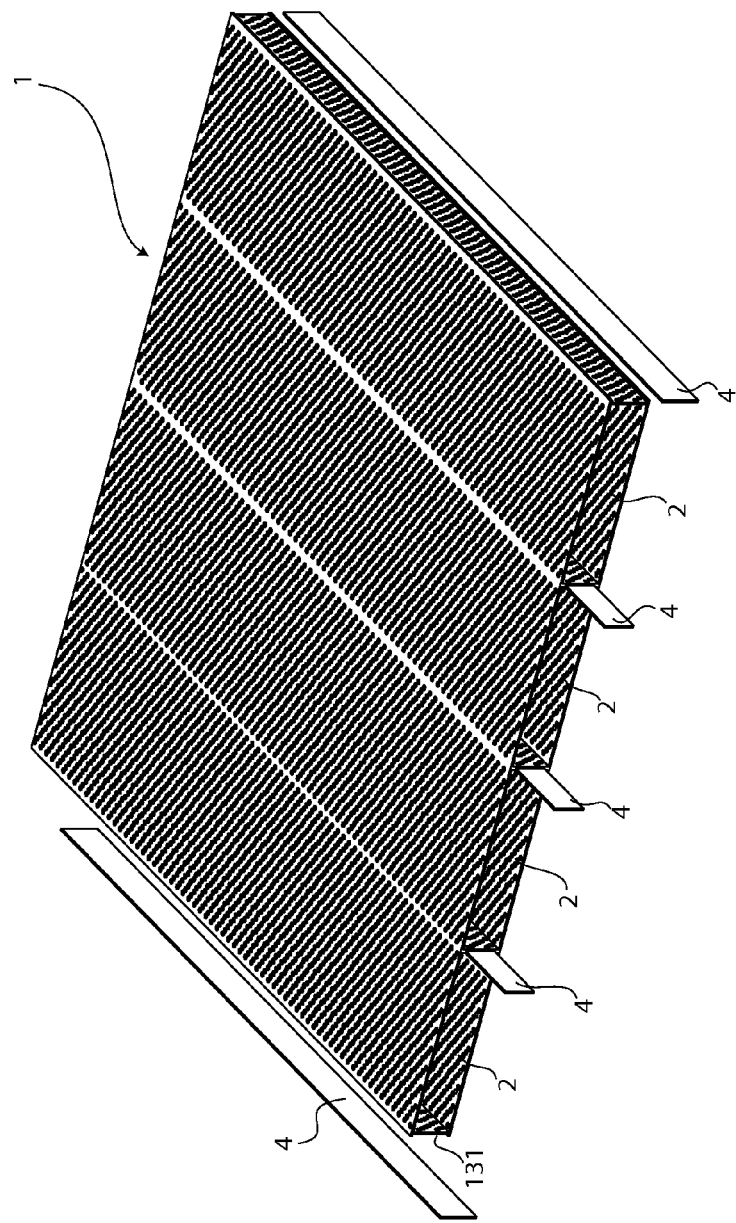
FIG. 12 is an exploded view of another embodiment of the present invention where the hollow sheet is one piece with the plurality of cavities being defined by the plurality of partitions.

The insert connector end 14 is a protruding hollow notch that is positioned on one end of the hollow sheet 1. The receiving connector end 15 is a recessed groove on the end of the hollow sheet 1 opposite of the insert connector end 14. The insert connector end 14 and the receiving connector end 15 provide the present invention with the ability to connect in series to create a larger hollow sheet 1. To reduce any direct conduction from one hollow sheet 1 to another, in this embodiment, the present invention further comprises of a connector thermal break 9. The connector thermal break 9 is U-shaped adapter that conforms to the shape of the receiving connector end 15. The connector thermal break 9 is positioned along the length of the receiving connector end 15 and ensures the reduction of direct conduction between two connected hollow sheets 1. In another embodiment of the present invention the hollow sheet can be a single sheet without the insert connector end 14 and the receiving connector end 15 as shown in FIG. 10-12.

Vessels also have holes through both interior and exterior walls for additional thermal breaking. One part and two parts vessels have holes though all polycarbonate walls throughout the vessel components for reducing the conduction of heat through the otherwise continuous through the polycarbonate walls. The exterior polycarbonate vessel walls having thermal breaking holes will be laminated for the purpose of sealing them should the suitable gel insulating substance be in particle form in order to eliminating any leak of particles through the thermal breaking holes. Should transparent or transparent polymer cross-linked aerogels (X-Aerogels) be used there would be no leak of particles due to it not being in particle form.

In any embodiment of the present invention the hollow sheet can be multi-layered. When the present invention is in multiple layers, the thermal break can be used to connect each layer to thoroughly thermally break the hollow sheet. The manufacturer is able to place a thermal break between every layer or place the thermal break in between selected layers.

Due to certain designs included in the invention the insulating substance may at times be loaded through the side into the interior thermoplastic panel unlike traditional art that is traditionally loaded into continuous channels through open side edges only.

Due to the flexible nature of certain thermal breaking insulating materials, to include although not limited to durable polymer cross-linked transparent or translucent aerogels (X-Aerogels) having elasticity yet capable of supporting a load, it will more readily conform to variations in tolerance often found in thermoplastic glazing and said insulating substance is additional bound by the transparent acrylic adhesive. When said thermal breaking material is to be inserted into a channel or cavity a lower viscosity transparent adhesive may be used to reduce friction due to its molecular makeup whereby resulting in less friction. Thermal breaks may be used in many locations, shapes and ways due to so many thermoplastic glazing configuration possibilities thereby the invention is never intended to be limited in scope due to the very nature of so many configuration possibilities.

In conclusion, the thermal break 4 serves to join the two totally separated polycarbonate surfaces in need of a connection. However, polycarbonate that is separated only partially through the utilization of making holes though the same polycarbonate cavity wall leaves a partial connection in place for the benefit of having a constant partial connection for maintaining constant alignment throughout the manufacturing process when preferred by the fabricator. These holes alone provide a thermal breaking effect. The holes along with an added separate and supportive thermal breaking component collectively serve as a thermal break having additional support. Furthermore, it is also claimed, although the separate thermal break is laminated with the reflective material, when a layer of polycarbonate is directly against the thermal break 4, the polycarbonate may be laminated in place of the thermal break 4 as both would reflect the image of polycarbonate and/or suitable gel insulating substance therefore providing the intended desirable aesthetic advantages. Should transparent or transparent polymer cross-linked aerogels (X-Aerogels) be used for the thermal break laminating with the reflective film laminate material would not be necessary.

What is claimed is:

1. A Thermally Broken Hollow Polycarbonate Sheet Window Glazing comprises,
    a hollow sheet comprising a first sheet and a second sheet;
    an interior vessel film;
    a plurality of thermal break;
    a thermal break adhesive;
    an insulating element;
    the first sheet comprises of a plurality of first thermal break notches, a plurality of first holes, and a plurality of first cavities; and
    the second sheet comprises of a plurality of second thermal break notches, a plurality of second holes, and a plurality of second cavities.

2. The thermally broken hollow polycarbonate sheet window glazing as claimed in claim 1 comprises,
    the plurality of first thermal break notches being extended from the first sheet;
    the plurality of second thermal break notches being extended from the second sheet;
    the plurality of first holes being holes traversing through and being evenly distributed on the first sheet; and
    the plurality of second holes being holes traversing through and being evenly distributed on the second sheet.

3. The thermally broken hollow polycarbonate sheet window glazing as claimed in claim 1 comprises,
    the plurality of thermal breaks comprises notch grooves; and
    the notch grooves being indented grooves traversing along each of the thermal breaks, wherein the plurality of thermal breaks and the notch grooves are shaped correspondingly to the plurality of first thermal break notches and the plurality of second thermal break notches.

4. The thermally broken hollow polycarbonate sheet window glazing as claimed in claim 1 comprises,
    the first sheet being connected to the second sheet by means of the plurality of thermal breaks;
    the plurality of thermal breaks being engaged to the plurality of first thermal break notches by means the notch grooves;
    the notch grooves being adhered to the plurality of first thermal break notches by means of the thermal break adhesive;
    the plurality of thermal break being engaged to the plurality of second thermal break notches by means of the notch grooves; and
    the notch grooves being adhered to the plurality of second thermal break notches by means of the thermal break adhesive.

5. The thermally broken hollow polycarbonate sheet window glazing as claimed in claim 1 comprises, the plurality of first cavities being isolated cavities traversing through the first sheet in parallel relationship to the plurality of first thermal break notches; and
the plurality of second cavities being isolated cavities traversing through the second sheet in parallel relationship to the plurality of second thermal break notches.

6. The thermally broken hollow polycarbonate sheet window glazing as claimed in claim 1 comprises,
a plurality of cavities being defined by the first sheet, the second sheet, and the thermal breaks;
the plurality of cavities being laminated by means of the interior vessel film, wherein the lamination of the plurality of cavities seals the plurality of first holes and the plurality of second holes; and
the plurality of cavities being filled by the insulating element.

7. The thermally broken hollow polycarbonate sheet window glazing as claimed in claim 6 comprises,
a plurality of end openings, wherein the plurality of end openings is defined by the holes defined by the first sheet, the second sheet, and the plurality of thermal breaks leading into the plurality of cavities, the plurality of first cavities, and the plurality of second cavities;
the plurality of end openings being sealed by an end sealing film; and
the end sealing film being adhered to the plurality of end openings.

8. A Thermally Broken Hollow Polycarbonate Sheet Window Glazing comprises,
a hollow sheet comprising a plurality of partitions, an insert connector end, a receiving connector end, a first sheet, a second shirt, a plurality of first holes and a plurality of second holes;
a connector thermal break;
a plurality of cavities;
an interior vessel film;
a plurality of thermal breaks;
a thermal break adhesive;
an insulating element;
an end sealing film; and
the plurality of partitions comprises a thermal break groove.

9. The thermally broken hollow polycarbonate sheet window glazing as claimed in claim 8 comprises,
the plurality of cavities being spaces in the hollow sheet defined by the plurality of partitions;
the receiving connector end and the insert connector end being positioned on opposite sides of the hollow sheet;
the receiving connector end being a recessed groove channel traversing through the hollow sheet; and
the insert connector being a protruding notch, wherein the insert connector is shaped to fit within the receiving connector.

10. The thermally broken hollow polycarbonate sheet window glazing as claimed in claim 9 comprises,
the connector thermal break positioned adhered along the receiving connector end, wherein the connector thermal break is a u-shaped adapter.

11. The thermally broken hollow polycarbonate sheet window glazing as claimed in claim 8 comprises,
the thermal break grooves being indented grooves traversing along each of the plurality of partitions, wherein the thermal break grooves and the plurality of thermal breaks are shaped correspondingly; and
the plurality of thermal breaks being adhered and secured in the thermal break grooves by means of the thermal break adhesive.

12. The thermally broken hollow polycarbonate sheet window glazing as claimed in claim 8 comprises,
the plurality of first holes and the plurality of second holes traversing through the first sheet and the second sheet, respectively;
the plurality of cavities being the spaces within the hollow sheet defined by the plurality of partitions;
the plurality of cavities being laminated by the interior vessel film, wherein the lamination of the plurality of cavities seals the plurality of holes; and
the plurality of cavities being filled by the insulating element.

13. The thermally broken hollow polycarbonate sheet window glazing as claimed in claim 8 comprises,
a plurality of end openings, wherein the plurality of end openings is defined by the holes defined by the first sheet, the second sheet, and the plurality of thermal breaks leading into the plurality of cavities, the plurality of first cavities, and the plurality of second cavities;
the plurality of end openings being sealed by the end sealing film; and
the end sealing film being adhered to the plurality of end openings.

14. A Thermally Broken Hollow Polycarbonate Sheet Window Glazing comprises,
a hollow sheet comprising a first sheet and a second sheet;
an interior vessel film;
a plurality of thermal break;
a thermal break adhesive;
an insulating element;
the first sheet comprises of a plurality of first thermal break notches and plurality of first holes; and
the second sheet comprises of a plurality of partitions and a plurality of second holes.

15. The thermally broken hollow polycarbonate sheet window glazing as claimed in claim 14 comprises,
the plurality of first thermal break notches being extended from the second sheet;
the plurality of first holes being holes traversing through and being evenly distributed on the first sheet;
the plurality of partitions being extended from the second sheet;
the plurality of partitions comprises a thermal break groove and a partition notch; and
the plurality of second holes being holes traversing through and being evenly distributed on the second sheet.

16. The thermally broken hollow polycarbonate sheet window glazing as claimed in claim 15 comprises,
The plurality of thermal breaks being positioned within the thermal break groove; and
The plurality of thermal breaks being secured in the thermal break groove by means of the thermal break adhesive.

17. The thermally broken hollow polycarbonate sheet window glazing as claimed in claim 15 comprises,
the first sheet being connected to the second sheet by means of the partition notch; and
the second sheet being engaged to the plurality of first thermal break notches by means the partition notch.

18. The thermally broken hollow polycarbonate sheet window glazing as claimed in claim 14 comprises,
a plurality of cavities being defined by the first sheet, the second sheet, and the plurality of partitions;
the plurality of cavities being laminated by means of the interior vessel film, wherein the lamination of the plurality of cavities seals the plurality of first holes and the plurality of second holes; and the plurality of cavities being filled by the insulating element.

19. The thermally broken hollow polycarbonate sheet window glazing as claimed in claim 18 comprises,
   a plurality of end openings, wherein the plurality of end openings is defined by the holes defined by the first sheet, the second sheet, and the plurality of thermal breaks leading into the plurality of cavities;
   the plurality of end openings being sealed by an end sealing film; and
   the end sealing film being adhered to the plurality of end openings.

20. A Thermally Broken Hollow Polycarbonate Sheet Window Glazing comprises,
   a hollow sheet comprising a first sheet and a second sheet;
   an interior vessel film;
   a continuous thermal break;
   a thermal break adhesive;
   a sheet cavity;
   the first sheet comprises of a plurality of first thermal break notches, a plurality of first holes; and
   the second sheet comprises of a plurality of second thermal break notches, a plurality of second holes.

21. The thermally broken hollow polycarbonate sheet window glazing as claimed in claim 20 comprises,
   the plurality of first thermal break notches being extended from the first sheet;
   the plurality of second thermal break notches being extended from the second sheet;
   the plurality of first holes being holes traversing through and being evenly distributed on the first sheet; and
   the plurality of second holes being holes traversing through and being evenly distributed on the second sheet.

22. The thermally broken hollow polycarbonate sheet window glazing as claimed in claim 20 comprises,
   the continuous thermal breaks comprises a plurality of notch grooves; and
   the plurality of notch grooves being grooves with protruding notches traversing along the continuous thermal breaks, wherein the continuous thermal breaks and the notch grooves are shaped correspondingly to the plurality of first thermal break notches and the plurality of second thermal break notches.

23. The thermally broken hollow polycarbonate sheet window glazing as claimed in claim 20 comprises,
   the sheet cavity being a space between the first sheet and the second sheet;
   the first sheet being connected to the second sheet by means of the continuous thermal break;
   the continuous thermal break being in complete contact with the first sheet and the second sheet;
   the continuous thermal break being engaged to the plurality of first thermal break notches by means the notch grooves;
   the plurality of notch grooves being adhered to the plurality of first thermal break notches by means of the thermal break adhesive;
   the continuous thermal break being engaged to the plurality of second thermal break notches by means of the plurality notch grooves;
   the plurality of notch grooves being adhered to the plurality of second thermal break notches by means of the thermal break adhesive; and
   the continuous thermal break filling the sheet cavity.

24. The thermally broken hollow polycarbonate sheet window glazing as claimed in claim 23 comprises,
   the internal vessel film being adhered to the first sheet and the second sheet;
   the internal vessel film being positioned between the first sheet and the continuous thermal break and between the second sheet and the continuous thermal break, wherein the continuous thermal break possesses the optical property selected from the group consisting of being transparent, translucent, non-transparent, and non-translucent; and
   a thermal break film being laminated on the continuous thermal break.

25. The thermally broken hollow polycarbonate sheet window glazing as claimed in claim 24 comprises,
   Wherein when the continuous thermal break is transparent or translucent, the thermal break film is also transparent.

26. The thermally broken hollow polycarbonate sheet window glazing as claimed in claim 24 comprises,
   Wherein when the continuous thermal break is non-transparent or non-translucent, the thermal break film is reflective.

27. The thermally broken hollow polycarbonate sheet window glazing as claimed in claim 23 comprises,
   a plurality of end openings, wherein the plurality of end openings is defined by the holes defined by the first sheet, the second sheet, and the continuous thermal breaks;
   the plurality of end openings being sealed by an end sealing film; and
   the end sealing film being adhered to the plurality of end openings.

* * * * *